United States Patent
Guthrie et al.

(10) Patent No.: US 9,483,403 B2
(45) Date of Patent: *Nov. 1, 2016

(54) TECHNIQUES FOR PRESERVING AN INVALID GLOBAL DOMAIN INDICATION WHEN INSTALLING A SHARED CACHE LINE IN A CACHE

(71) Applicant: INTERNATIONAL BUSINESS MACHINES CORPORATION, Armonk, NY (US)

(72) Inventors: Guy L. Guthrie, Austin, TX (US); Hien Minh Le, Cedar Park, TX (US); Jeffrey A. Stuecheli, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/306,661

(22) Filed: Jun. 17, 2014

(65) Prior Publication Data
US 2015/0363317 A1  Dec. 17, 2015

(51) Int. Cl.
*G06F 12/00* (2006.01)
*G06F 12/08* (2016.01)

(52) U.S. Cl.
CPC ....... *G06F 12/0828* (2013.01); *G06F 12/0817* (2013.01); *G06F 12/0833* (2013.01); *G06F 12/0864* (2013.01); *G06F 12/0897* (2013.01); *G06F 12/0831* (2013.01); *G06F 2212/314* (2013.01); *G06F 2212/6032* (2013.04)

(58) Field of Classification Search
None
See application file for complete search history.

(56) References Cited

U.S. PATENT DOCUMENTS

| 7,865,686 | B2 | 1/2011 | Akimoto |
| 8,381,002 | B2 | 2/2013 | Nayar et al. |
| 8,381,005 | B2 | 2/2013 | Arndt et al. |
| 8,448,006 | B2 | 5/2013 | Floyd et al. |
| 2012/0210331 | A1 | 8/2012 | Davidson, II et al. |
| 2012/0311244 | A1 | 12/2012 | Huang et al. |

*Primary Examiner* — Brian Peugh
(74) *Attorney, Agent, or Firm* — Michael R. Long; Steven L. Bennett

(57) ABSTRACT

A technique for operating a memory system for a node includes interrogating, by a cache, an associated cache directory to determine whether a shared cache line to be installed in the cache is associated with an invalid global state in the cache. The invalid global state specifies that a version of the shared cache line has been intervened off-node. In response to the shared cache line being in the invalid global state the cache spawns a castout invalid global command for the shared cache line. The shared cache line is installed in the cache. A coherence state for the shared cache line is updated in the associated cache directory to indicate the shared cache line is shared.

13 Claims, 5 Drawing Sheets

TECHNIQUES FOR PRESERVING AN INVALID GLOBAL DOMAIN INDICATION WHEN INSTALLING A SHARED CACHE LINE IN A CACHE

BACKGROUND

The disclosure is generally directed to preserving an invalid global domain indication for a cache line and, more particularly, to techniques for preserving an invalid global domain indication when installing a shared cache line in a cache.

Modern microprocessors typically include entire storage hierarchies (caches) integrated into a single integrated circuit. For example, one or more processor cores that include level 1 (L1) instruction and/or data caches are often combined with a shared on-chip level 2 (L2) cache and may be combined with a shared on-chip level 3 (L3) cache. Caches in a cache hierarchy typically include cache directories that, among other functions, maintain one or more cache coherency states for each cache line in a cache array.

An invalid global (IG) state is a cache coherency state that indicates: an associated memory block (e.g., a cache line) in a cache array is invalid; an address tag in a cache directory is valid; and a copy of the memory block identified by the address tag may possibly be cached in another node in a coherency domain (which includes a group of nodes in which coherency is maintained). The IG state may be formed in a lower level cache in response to the lower level cache providing a requested memory block to a requestor in another node of a coherency domain in response to an exclusive access request. The IG state may, for example, only be formed in a node of a coherency domain that includes a lowest point of coherency (LPC) for the memory block. In such embodiments, some mechanism (e.g., a partial response by the LPC and subsequent combined response) is typically implemented to indicate to a cache sourcing a requested memory block that the LPC is within its node of the coherency domain. In other embodiments that do not support the communication of an indication that the LPC is local, an IG state may be formed any time that a cache sources a memory block to a remote node in the coherency domain in response to an exclusive access request.

An LPC may, for example, be a memory device or an input/output (I/O) device that serves as a repository for a memory block. In the absence of a highest point of coherency (HPC) for a memory block, an LPC stores a true image of the memory block and has authority to grant or deny requests to generate an additional cached copy of the memory block. For a typical request in a data processing system, an LPC corresponds to a memory controller for main memory that stores a referenced memory block. In general, an HPC is a uniquely identified device that caches a true image of a memory block (which may or may not be consistent with the corresponding memory block at the LPC) and has the authority to grant or deny a request to modify the memory block. An HPC may also provide a copy of a memory block to a requestor in response to an operation that does not modify the memory block.

BRIEF SUMMARY

A technique for operating a memory system for a node includes interrogating, by a cache, an associated cache directory to determine whether a shared cache line to be installed in the cache is associated with an invalid global state in the cache. The invalid global state specifies that a version of the shared cache line has been intervened off-node. In response to the shared cache line being in the invalid global state the cache spawns a castout invalid global command for the shared cache line. The shared cache line is installed in the cache. A coherence state for the shared cache line is updated in the associated cache directory to indicate the shared cache line is shared.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
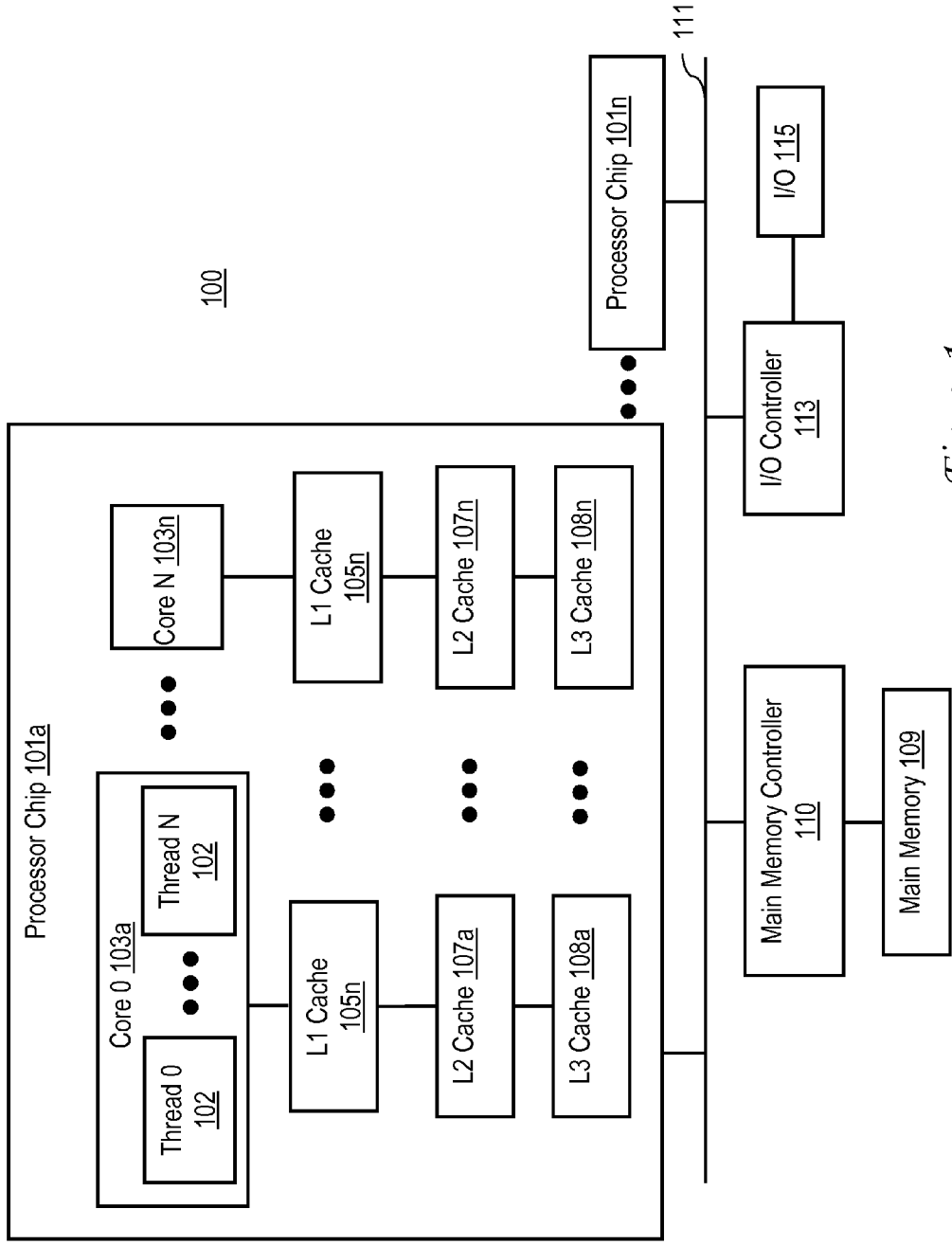
FIG. 1 is a diagram of a relevant portion of an exemplary data processing system environment that is configured to preserve an invalid global (IG) domain indication when installing a shared cache line in a cache, according to the present disclosure.

The illustrative embodiments provide a method, a memory system, and a data processing system configured to preserve an invalid global domain indication when installing a shared cache line in a cache.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As used herein, the term 'system memory' is synonymous with the term 'main memory' and does not include 'cache' or 'cache memory'.

When installing a shared cache line into a cache memory (cache) it is possible that the cache line may already have an associated invalid global (IG) domain indication that specifies the cache line has been previously intervened to an off-node cache. In this case, any attempt to store to the cache line requires a broadcast of sufficient scope to locate a highest point of coherency (HPC) copy of the cache line. As such, it is desirable to preserve the IG domain indication. Unfortunately, preserving the IG domain indication may result in the inability of the cache to accept the shared copy of the cache line (as the cache cannot store two versions of a same cache line) and, as such, the shared copy of the cache line may be discarded.

When the shared copy of the cache line is marked with the ability to deliver early data without waiting on a combined response (i.e., a shared cache line is marked as a shared last (SL) cache line), a performance penalty is associated with the loss of the shared copy of the cache line. In various embodiments, a node can only have one shared copy of a cache line in the SL state. One solution to avoid the performance penalty associated with losing a cache line marked as an SL cache line is to add a specific directory state in the cache that indicates that a cache line is both SL and IG. However, in relatively large caches the addition of a bit in a directory to encode a cache line as both SL and IG can be expensive in terms of area and power required. That is, the number of directory bits that are implemented to encode cache line states is usually limited due to area and power requirements. For example, using four bits for cache line states allows sixteen different cache line states to be encoded. As another example, using five bits for cache line states allows thirty-two different cache line states to be encoded.

According to the present disclosure, techniques for spawning a castout of an IG domain indication from a cache (e.g., a level 3 (L3) cache) while simultaneously installing an SL cache line in the cache is disclosed. The techniques preserve the early data ability within a node while at the same time meeting the requirements of preserving the IG domain indication to maintain coherency in multi-node systems. The disclosed techniques may advantageously be implemented without increasing a size of a cache directory.

According to one aspect of the present disclosure, when a cache receives a shared cache line to install (e.g., due to a demand load, a higher level cache eviction, or a prefetch), the cache examines an associated cache directory to determine if the cache currently has the same cache line in the IG state (i.e., the cache line has been intervened off-node). In the event that the shared cache line has an IG domain indication, the cache spawns a castout IG command of the address of the shared cache line to a main memory controller, while continuing the process of installing the copy of the shared cache line (which may be an S copy or an SL copy of the shared cache line) in the cache. Assuming the shared cache line is an SL cache line, the SL cache line is then written into the cache, and the cache directory is then updated with the SL state for the SL cache line. Assuming the shared cache line is an S cache line, the S cache line is then written into the cache, and the cache directory is then updated with the S state for the S cache line.

In response to receiving the castout IG of the address of the shared cache line, a main memory controller stores a memory domain bit in conjunction with data associated with the cache line in main memory (e.g., in association with the cache line). In response to a master within a local node (that spawned the castout IG) later requesting the cache line in main memory, the main memory controller examines the memory domain bit associated with the data associated with the cache line and indicates to the master that the cache line is IG and that the request for the data associated with the cache line must be broader in scope (i.e., not limited to the local node) in order for the master to locate an HPC of the cache line.

With reference now to the figures and in particular, with reference to FIG. 1, a multi-processor data processing system (MP) 100 is illustrated that includes multiple processor chips 101 (each of which may function as a separate node of MP 100 and are labeled 101*a*-101*n*), memory 109, and input/output (I/O) device(s) 115. As is shown, I/O device(s) 115 have an associated I/O controller 113 and memory 109 has an associated memory controller 110 that controls access to and from memory 109. Processor chips 101 are connected to memory 109 and I/O devices 115 via interconnect (system bus) 111 by which processor chips 101 communicate with each other and with memory 109, I/O devices 115, and other peripheral devices. Interconnect 111 may be a bifurcated bus with a data bus for routing data and a separate address bus for routing address transactions and other operations. Processor chips 101 each include multiple (e.g., eight) processor cores 103, each of which may execute one or more threads 102 and have an associated L1 cache 105, an L2 cache 107, and an L3 cache 108. Each cache 105, 107, and 108 includes a cache directory, an array of cache lines, and all data operations at each cache are completed according to a coherency protocol, e.g., a MESI coherency protocol.

An exemplary cache line may include multiple blocks/granules of data, corresponding to individual bytes, words, double words, etc., each of which may be the target of an update by a processor-issued store operation or the target of a processor-issued load operation. The specific size of each cache line and number of updateable data blocks/granules may differ from system to system. While aspects of the present disclosure are described with specific reference to an L3 cache within a multi-level cache architecture, it should be understood that the disclosed embodiments may be implemented at a different level. The present invention is described with reference to MP 100 and component parts of MP 100 illustrated by FIG. 1 and FIG. 2 (described below), but may be applied to different configurations of data processing systems that are not necessarily conventional. As an example, the invention may be implemented within a non-uniform memory access (NUMA) system, wherein the system memory (random access memory (RAM)) is divided among two or more memory arrays (having separate memory controllers connected to the system bus) and allocated among the processing units. Also, MP 100 could include new hardware components not shown in FIG. 1, or have a novel interconnect architecture for existing components. MP 100 may also have a different number of processing units. Those skilled in the art will therefore appreciate that the present invention is not limited to the generalized system showing in FIG. 1.

Figure 2:
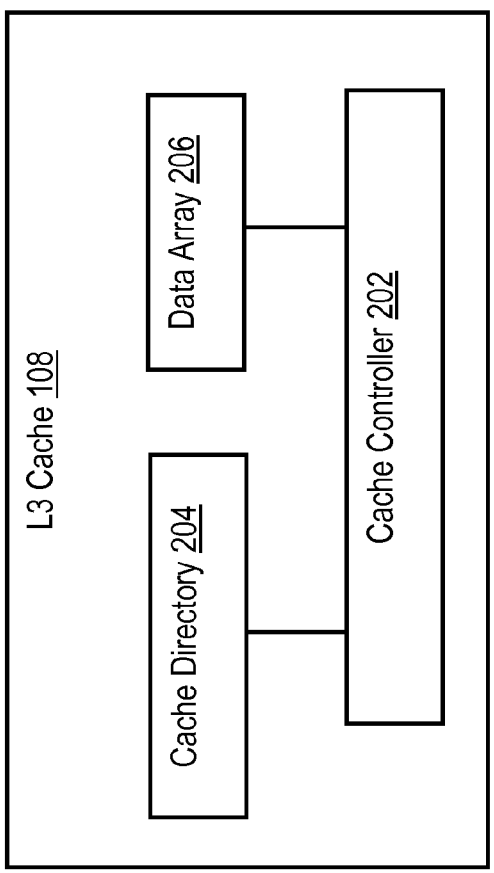
FIG. 2 is a diagram of an exemplary level 3 (L3) cache that is configured to preserve an IG domain indication when installing a shared cache line in a cache, according to the present disclosure.

With reference to FIG. 2, an exemplary level 3 (L3) cache 108 is illustrated that includes a cache directory 204, a data array 206, and a cache controller 202. Cache controller 202 is coupled to cache directory 204 and data array 206 and is configured to preserve an invalid global (IG) domain indication when installing a shared cache line in cache 108, according to the present disclosure. As is discussed in further detail herein, when cache 108 receives a shared cache line to install (e.g., due to a demand load, a higher level cache eviction, or a prefetch), cache controller 202 examines cache directory 204 to determine if the cache line has an IG domain indication associated with the shared cache line (i.e., the cache line has been intervened off-node). In the event that the shared cache line has an IG domain indication, cache controller 202 spawns a castout IG command of the address of the shared cache line to main memory controller 110, while continuing the process of installing the copy of the shared cache line (which may be an SL copy of the shared cache line) in cache 108. When the shared cache line is an SL cache line, the SL cache line is then written into cache 108, and cache directory 204 is then updated with the SL state for the SL cache line.

Figure 3:
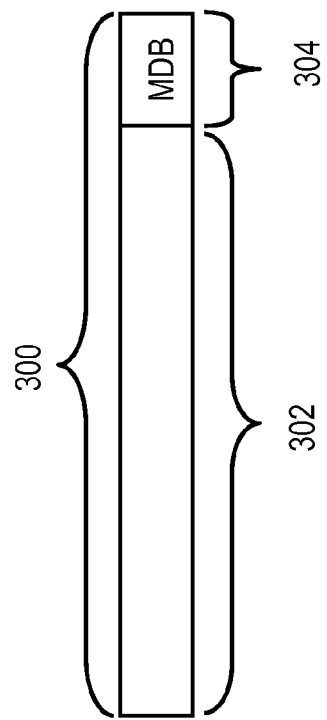
FIG. 3 is a diagram of an exemplary referenced memory block in main memory that includes a memory domain bit.

With reference to FIG. 3, a relevant portion of an exemplary referenced main memory block 300 is illustrated. Main memory block 300 includes a memory domain bit (MDB) 304 that is associated with an address and data 302. In various embodiments, a size of main memory block 300 corresponds to a size of a cache line implemented in L3 cache 108. Memory domain bit 304 is used by main memory controller 110 to determine whether a requested cache line (that references main memory block 300) is IG. In the event that memory domain bit 304 is asserted for data associated with a requested cache line, main memory controller 110 provides an indication to a master (e.g., processor core 103*a*) that the request for the data associated with the cache line must be broader in scope (i.e., not limited to a local node (e.g., processor chip 101*a*)). In response to receiving the indication, the master may then issue a broader scope request to locate a copy of the cache line in another node (e.g., processor chip 101*n* may include a copy of the cache line).

Figure 4:
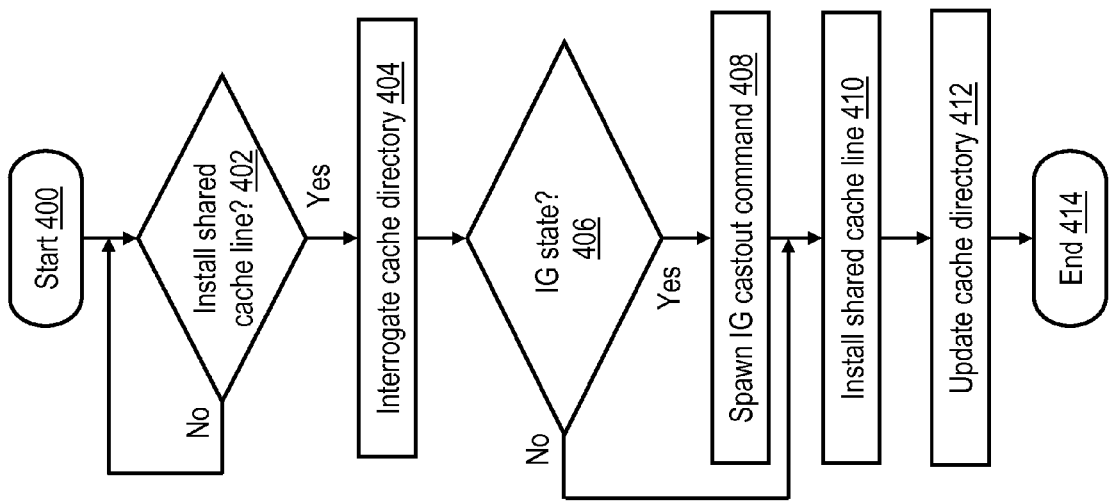
FIG. 4 is a flowchart of an exemplary process that is executed by a cache controller to preserve an IG domain indication when installing a shared cache line in a cache, according to an embodiment of the present disclosure.

With reference to FIG. 4, a flowchart of an exemplary process that is executed by cache controller 202 to preserve an invalid global (IG) domain indication when installing a shared cache line in cache 108, according to an embodiment of the present disclosure, is illustrated. The process begins at block 400 in response to, for example, cache controller 202 receiving a cache line to install in cache 108. In decision block 402, cache controller 202 determines whether the received cache line to install is a shared cache line. In response to the received cache line not being a shared cache line, control loops on block 402. In response to the received cache line being a shared cache line, control transfers from block 402 to block 404. In block 404, cache controller 202 interrogates cache directory 204 to determine whether a copy of the shared cache line is in an IG state in cache 108. The IG state specifies that the copy of the shared cache line has been intervened off-node (e.g., intervened from processor chip 101*a* to processor chip 101*n*, assuming that cache controller 202 is located in processor chip 101*a*).

From block 404 control transfers to decision block 406, where cache controller 202 determines whether the IG state was indicated. In response to the shared cache line not being in the IG state in block 406, control transfers to block 410. In response to the shared cache line being in the IG state in block 406, control transfers to block 408. In block 408, cache controller 202 spawns a castout IG command (to main memory controller 109) for the shared cache line. Next, in block 410, cache controller 202 installs the received shared cache line in cache 108. Then, in block 412, cache controller 202 updates cache directory 204 to indicate a state of the installed shared cache line, which may be in a shared state or a shared last state. Following block 412, the process terminates in block 414.

Figure 5:
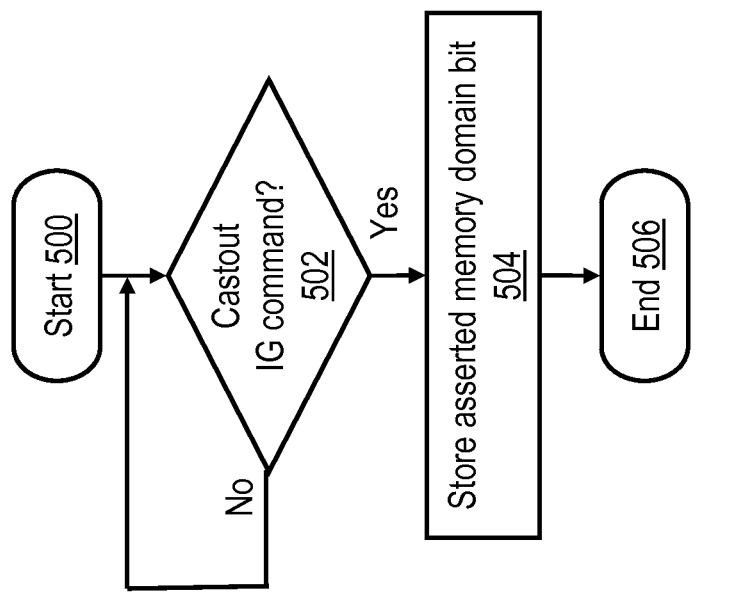
FIG. 5 is a flowchart of an exemplary process that is executed by a main memory controller to handle a castout IG command, according to an embodiment of the present disclosure.

With respect to FIG. 5, an exemplary process that is executed by main memory controller 110 to handle a castout IG command, according to an embodiment of the present disclosure, is illustrated. The process is initiated at block 500, e.g., in response to main memory controller 110 receiving a command from cache controller 202 of L3 cache 108, at which point control transfers to decision block 502. In block 502, main memory controller 110 determines whether a received command is a castout IG command. In response to the received command not being a castout IG command, control loops on block 502. In response to the received command being a castout IG command in block 502, control transfers to block 504. In block 504, main memory controller 110 stores an asserted memory domain bit 304 in main memory 109 in conjunction with the target memory block. Following block 504, the process terminates in block 506.

Figure 6:
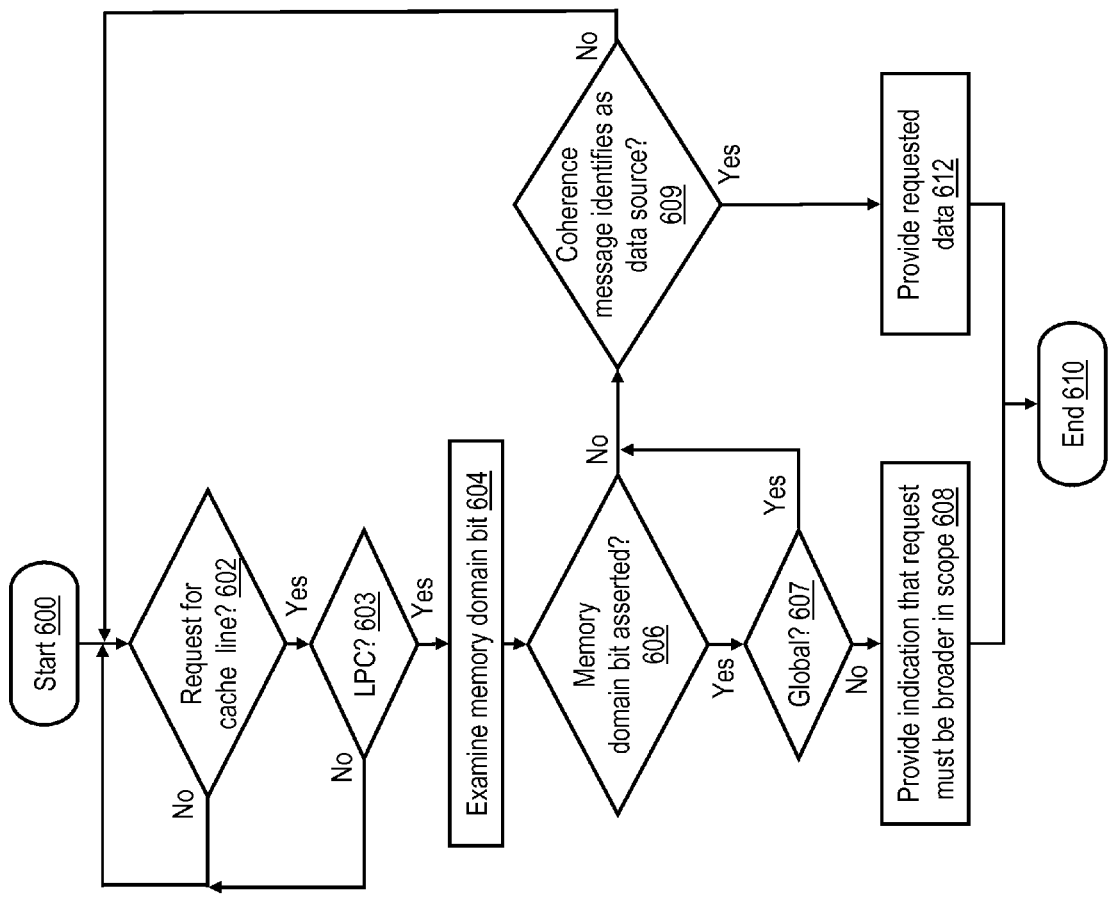
FIG. 6 is a flowchart of an exemplary process that is executed by a main memory controller to handle a request for a shared cache line, according to an embodiment of the present disclosure.

With reference to FIG. 6, an exemplary process that is executed by a main memory controller 110 to handle a request for data associated with a referenced cache line, according to an embodiment of the present disclosure, is illustrated. The process is initiated at block 600, e.g., in response to main memory controller 110 receiving a request from cache controller 202 of L3 cache 108, at which point control transfers to decision block 602. In block 602, main memory controller 110 determines whether a received request is a request for data associated with a referenced cache line. In response to the received request not being a request for data associated with a referenced cache line, control loops on block 602. In response to the received request being a request for data associated with a referenced cache line in block 602, control transfers to block 603. In block 603, main memory controller 110 determines whether it is the LPC. In response to main memory controller 110 determining that it is not the LPC, control transfers to block 602. In response to main memory controller 110 determining that it is the LPC, control transfers to block 604.

In block 604, main memory controller 110 examines a memory domain bit 304 in main memory 109 that is associated with data that is associated with the referenced cache line. Next, in decision block 606, main memory controller 110 determines whether memory domain bit 304 is asserted. In response to memory domain bit 304 being asserted in block 606, control transfers to block 607. In block 607, main memory controller 110 determines whether the request is a global request. In response to the request not being a global request in block 607, control transfers to block 608. In block 608, main memory controller 110 provides an indication (to cache controller 202 of L3 cache 108) that the scope of the request must be broader. Following block 608, the process terminates in block 610.

In response to the request being a global request in block 607, control transfers to block 609. In response to memory domain bit 304 not being asserted in block 606, control transfers to block 609. In block 609, main memory controller 110 determines whether a coherence message identifies main memory controller 110 as the data source. In response to main memory controller 110 not being identified as the data source in block 609, control transfers to block 602. In response to main memory controller 110 being identified as the data source in block 609, control transfers to block 612. In block 612, main memory controller 110 provides the data associated with the requested referenced cache line to cache controller 202 of L3 cache 108. Following block 612, the process terminates in block 610.

Accordingly, techniques have been disclosed herein that preserve an invalid global domain indication when installing a shared cache line in a cache.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A memory system for a node, the memory system comprising:
    a cache including:
        a cache directory;
        a data array; and
        a cache controller configured to:
            interrogate the cache directory to determine whether a shared cache line to be installed in the data array is associated with an invalid global state, wherein the invalid global state specifies that a version of the shared cache line has been intervened off-node;
            in response to the shared cache line being in the invalid global state, spawn a castout invalid global command for the shared cache line;
            install the received shared cache line in the data array; and
            update a coherence state for the shared cache line in the cache directory to indicate the shared cache line is shared.

2. The memory system of claim 1, wherein the memory system further includes:
    a main memory; and
    a main memory controller coupled to the main memory, wherein the main memory controller is configured to:
        receive the castout invalid global command for the shared cache line; and
        store an asserted memory domain bit in association with data of the shared cache line in the main memory in response to the received castout invalid global command.

3. The memory system of claim 2, wherein the memory controller is further configured to:
    receive a request for the data associated with the shared cache line in the main memory;
    examine the memory domain bit associated with the data associated with the requested shared cache line in the main memory in response to the received request; and
    provide, in response to the examined memory domain bit being asserted, an indication that the request for the data associated with the shared cache line in the main memory must be broader in scope in order to locate a highest point of coherency of the shared cache line.

4. The memory system of claim 3, wherein the request for the data associated with the shared cache line in the main memory is generated by a master within a same node as the cache.

5. The memory system of claim 1, wherein the cache receives the shared cache line due to a demand load.

6. The memory system of claim 1, wherein the cache receives the shared cache line due to a higher level cache eviction.

7. The memory system of claim 1, wherein the cache receives the shared cache line due to a prefetch.

8. The memory system of claim 1, wherein the cache is a level 3 (L3) cache.

9. A data processing system, comprising:
    one or more processor cores; and
    a cache coupled to one of the one or more processor cores, wherein the cache is configured to:
        interrogate an associated cache directory to determine whether a shared cache line to be installed in an associated data array is associated with an invalid global state, wherein the invalid global state specifies that a version of the shared cache line has been intervened off-node;
        in response to the shared cache line being in the invalid global state, spawn a castout invalid global command for the shared cache line;
        install the received shared cache line in the data array; and
        update a coherence state for the shared cache line in the cache directory to indicate the shared cache line is shared.

10. The data processing system of claim 9, further comprising:
    a main memory; and
    a main memory controller coupled to the main memory, wherein the main memory controller is configured to:
        receive the castout invalid global command for the shared cache line; and store an asserted memory domain bit in association with data of the shared cache line in the main memory in response to the received castout invalid global command.

11. The data processing system of claim 10, wherein the main memory controller is further configured to:
receive a request for the data associated with the shared cache line in the main memory;
examine the memory domain bit associated with the data associated with the requested shared cache line in the main memory in response to the received request; and
provide, in response to the examined memory domain bit being asserted, an indication that the request for the data associated with the shared cache line in the main memory must be broader in scope in order to locate a highest point of coherency of the shared cache line.

12. The data processing system of claim 11, wherein the request for the shared cache line in the main memory is generated by a master within a same node as the cache.

13. The data processing system of claim 9, wherein the cache receives the shared cache line due to a demand load, a higher level cache eviction, or a prefetch, and wherein the cache is a level 3 (L3) cache.

\* \* \* \* \*